Nov. 13, 1934.　　　C. C. FARMER　　　1,980,327
BACK-UP VALVE DEVICE
Filed July 7, 1932
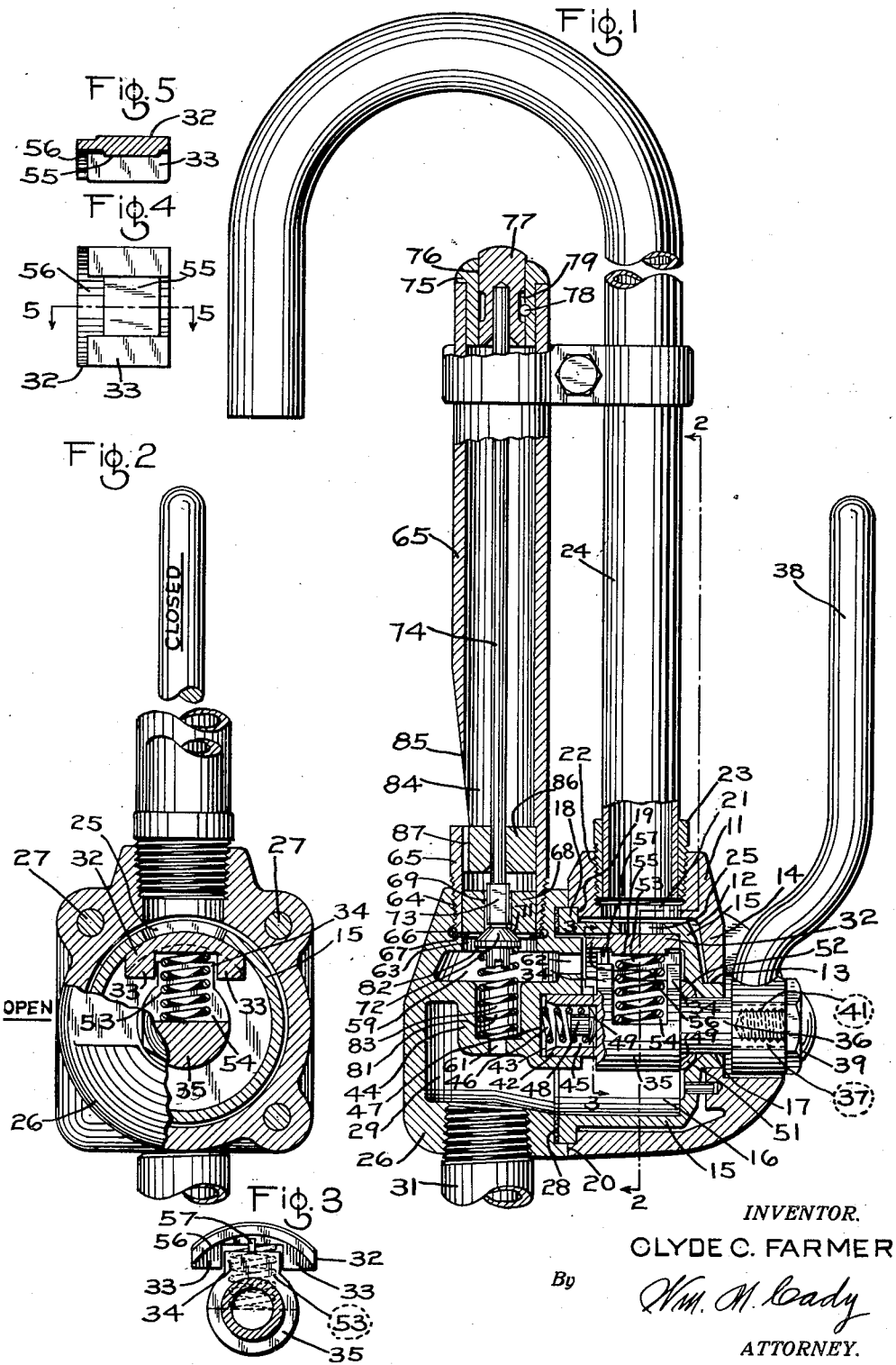
INVENTOR.
CLYDE C. FARMER
By Wm. M. Cady
ATTORNEY.

Patented Nov. 13, 1934

1,980,327

UNITED STATES PATENT OFFICE 1,980,327

BACK-UP VALVE DEVICE

Clyde C. Farmer, Pittsburgh, Pa., assignor to The Westinghouse Air Brake Company, Wilmerding, Pa., a corporation of Pennsylvania Application July 7, 1932, Serial No. 621,237

2 Claims. (Cl. 303—51)

This invention relates to valve devices and particularly to back-up valve devices employed on the rear cars of a train in conjunction with fluid brake equipment, by means of which an audible warning signal may be made or an application of the brakes on the train may be initiated.

An object of the invention is to provide an improved back-up valve device, wherein a signal valve device and a train pipe vent valve device are combined in a single structure that may be connected to a train pipe or brake pipe, and wherein parts of the valve device cooperate in such manner that the number of parts usually required is materially reduced and the assembly facilitated.

A further object of the invention is to provide a back-up valve device employing a simple vent valve device of the segmental valve type disclosed in the copending application, Serial No. 621,197, filed July 7, 1932, by Carlton D. Stewart and assigned to the assignee of this application, and wherein the cover for the said vent valve device is connected to the brake pipe and constitutes a support for the signal valve device and the vent valve device, and wherein provision is made for preventing improper assembly of the valve device.

A further object of the invention is to provide a back-up valve device that is simple and rugged in construction and which may be readily and inexpensively manufactured and assembled.

These and other objects of the invention that will be made apparent throughout the further description thereof, are attained by the back-up valve device hereinafter described and illustrated in the accompanying drawing; wherein Fig. 1 is a longitudinal sectional view, partially in elevation, of an improved back-up valve device embodying features of the invention;

Fig. 2 is a transverse sectional view, partially in elevation, of the device shown in Fig. 1, the section being taken on the line 2—2 thereof;

Fig. 3 is an elevational view, partially in section, of the segment valve and operating shaft therefor, the section being taken on the line 3—3 of Fig. 1;

Fig. 4 is a plan view of the segment valve shown in Figs. 1 and 2; and

Fig. 5 is a longitudinal section through the valve shown in Fig. 4 taken on the line 5—5 thereof.

Referring to the drawing, the back-up valve device comprises a casing 11 having a chamber 12 therein open at one end and having a bearing opening 13 in the end wall 14 of the casing. A valve seat bushing 15 having a valve chamber 16 open at one end and provided with a bearing opening 17, is disposed within the chamber 12 and is provided with an outwardly extending flange portion 18, that fits within an annular recess 19 in the attaching face of the casing 11 and which serves to close the open end of the chamber 12.

The casing 11 is provided with an outlet port 21 having a threaded portion 22 for receiving a threaded bushing 23 that is secured to a vent pipe 24 which is of inverted U shape, so that it will downwardly discharge fluid vented from the outlet port 21. The bushing 15 is provided with an outlet port 25, which establishes communication between the valve chamber 16 and the outlet port 21 in the casing 11. The casing 11 and bushing 15 are provided with a cover 26, which is secured to the casing 11 by means of bolts 27, with a packing gasket 28 disposed between the cover and the outer face of the flange 18 of the bushing 15 as indicated in Fig. 1. The attaching face 20 of the cover makes a butt contact with the attaching face of the casing 11. Thus a fluid tight joint is provided between the cover 26, bushing 15 and the casing 11.

The cover 26 is provided with a chamber 29 that registers with the chamber 16, and which constitutes a continuation thereof, that is adapted to be supplied with fluid under pressure from the brake pipe 31, which is threaded into the cover 26. A segment valve 32, having seated engagement with the inner cylindrical surface of the valve seat bushing 15, is mounted for sliding movement over said surface of the bushing 15, so that it may cover and uncover the outlet port 25 in the bushing 15. The valve 32 is provided with spaced lugs 33, between which lugs 34 on an operating shaft 35 extend so as to provide a lost motion connection between the operating shaft 35 and the segment valve 32. The operating shaft 35 is provided with a stem 36, which extends through the bearing opening 17 of the bushing 15, which in turn extends through the bearing opening 13 in the casing 11. The outer end of the stem 36 is provided with a square portion 37 upon which an operating handle 38, having a square hole therethrough, is secured by means of a cap screw 39 that is threaded into a threaded bore 41 in the square portion 37 of the stem 36.

The inner end of the shaft 35 is provided with a reduced bearing portion 42, that extends into a bearing recess 43 provided in a lug 44 formed integrally with the cover 26. The reduced portion 42 of the shaft 35 is provided with a recess 45 in which a spring 46 is disposed. The spring 46 is interposed between the bottom 47 of the recess 43 and an anti-friction stud 48 having a rounded end 49, which bears against the bottom of the recess 45 in the reduced portion 42 of the shaft 35. The spring 46 serves to yieldingly press the shaft 35 outwardly, so that the shoulder 49 thereon engages an annular packing ring 51 disposed between the shoulder 49 and the inclined annular surface 52 surrounding the bearing opening 17 in the bushing 15. Thus a fluid-tight seal surrounds the stem 36 and prevents leakage of fluid from the valve chamber 16 past the stem 36 and through the bearing opening 17 in the bushing 15.

A spring 53 is mounted in a transverse slot 54 in the shaft 35 and serves to press the valve 32 against the cylindrical valve seat of the bushing 15. The valve 32 is also held in engagement with the valve seat of the bushing 15 by means of the fluid pressure within the chamber 16, to which the inner face of the valve is subjected.

Referring to Figs. 1 and 4, the valve 32 is provided, intermediate the lugs 33, with a seat 55 that is raised slightly above the cylindrical portion 56 of the valve 32, and it will be noted that the seat 55 is disposed a greater distance from the outer end than from the inner end of the valve. In order to prevent improper positioning of the segmental valve 32 upon its seat within the bushing chamber 16, the shaft 35 is provided with a lug 57 which, as indicated in Figs. 1 and 3, extends radially beyond the surface of the seat 55. Should the valve 32 be improperly positioned within the bushing chamber 16, that is, should its position be reversed, the seat 55 will register with the lug 57 and prevent assembly of the shaft and valve within the bushing 15. This construction is of particular advantage in insuring replacement of the valve upon the valve seat in its original relative position with respect thereto, thereby insuring a fluid-tight seal between the valve and its seat. It has been found that where the valve is improperly positioned as above described, leakage frequently occurs.

The cover 26 is provided with a signal valve chamber 59, which communicates with the valve chamber 16 through passages 61 and 62. The chamber 59 is provided with an opening 63 having a threaded portion 64 which receives the threaded end portion of a tubular whistle device 65 that is screwed into sealing contact with a gasket 66 disposed between the end of the tube 65 and a seat 67 in the cover 26. The inner end of the whistle tube 65 is provided with a plug 68 having an outlet port 69 and a valve seat 71, which is adapted to be closed by a conical valve 72 having a fluted guide stem 73 which slidably engages the walls of the port 69. The outer end of the whistle tube 65 is provided with a guide bushing 75 having a bore 76 in which a push button 77 is slidably mounted. The button 77 is attached to the outer end of a stem 74, which engages the outer end of the fluted valve stem 73, and outward movement of the plug is limited by a pin 78 in the bushing 75, which extends across an annular groove 79 in the button 77 and which is engaged by the walls of the groove for limiting inward and outward movement of the push button 77. The pin 78 also retains the bushing 75 in assembled position.

The conical valve 72 is yieldingly biased toward its closed position by means of a spring 81 interposed between a shoulder 82 on the valve and the bottom wall of a recess 83 in which the spring 81 is mounted. When the push button 77 is pressed inwardly the stem 74 engages the fluted stem 73 of the valve 72 and moves it to open position, so that fluid under pressure may be discharged from the valve chamber 16 through ports 62 and 61, valve chamber 59 and through the outlet port 69.

The whistle tube 65 is provided with the usual vent orifice 84 having its marginal edge 85 tapered to a knife edge and the tube is provided with a plug 86 adjacent the lower edge of the orifice, which is cut away at one side to provide a narrow passage 87 through which the fluid flowing from the outlet port 69 may flow when the valve 72 is open. The discharged fluid striking the thin marginal edge of the orifice 84 produces an audible whistling sound in the well known manner.

In operation, assuming the valve to be secured to the end of the brake pipe on the rear or another car of a train, an audible signal may be produced by the trainman pressing the push button 77 inwardly to open the valve 72 and permit the passage of fluid under pressure from the chamber 16 through the whistle in the manner specified. It will be understood that the amount of fluid permitted to pass to the valve port 69 is limited by the capacity of the ports 62 and 61 and these ports are so proportioned that when the valve 72 is fully open, fluid is discharged from the brake pipe at a rate insufficient to cause an application of the brakes. Therefore, operation of the whistle will not effect an application of the brakes.

When it is desired to effect an application of the brakes by operation of the back-up valve, the operating handle 38 is rotated for moving the valve 32 within the chamber 16, so as to uncover the outlet port 25 in the bushing 15. Fluid under pressure is then vented from the brake pipe at a rate sufficient to cause an application of the brakes as desired. If a slight application is desired, the outlet port 25 is slightly uncovered and in case it is desired to make an emergency application of the brakes, the valve 32 is moved to completely uncover the outlet port 25.

It will be apparent from the foregoing that the back-up valve structure disclosed is simple and inexpensive in construction, and that certain parts of the signal valve device and the vent valve device cooperate to constitute a single structure, thereby rendering it possible to reduce the number of parts to a minimum and to thereby increase the effectiveness of the valve device and reduce the cost of manufacture.

While I have disclosed but one embodiment of the invention, it is apparent that changes may be made in this structure without departing from the spirit of the invention.

Having now described my invention, what I claim as new and desire to secure by Letters Patent, is:

1. A back-up valve device comprising a pair of cooperating casing members adapted to be joined by a fluid-tight seal and containing a chamber having an inlet port and two separate outlet ports, a fluid operated signal device on one casing member operating on fluid supplied through one outlet port, a valve device for controlling the delivery of fluid to said signal device through said outlet port, a second valve device in the other casing for covering and uncovering said other port, an operating member for said second valve device, and a bearing in each casing member for rotatably supporting said operating member and disposed on opposite sides of said second valve device.

2. A back-up valve device comprising a casing member having a valve chamber therein and an outlet port, a cover member for said casing having an inlet port and an outlet port communicating with said chamber, a fluid operated signal device on said cover operating on fluid supplied through the outlet port in the cover member, a manually operable valve on the cover member for controlling the flow of fluid through said outlet port in said cover, a second valve in said chamber for covering and uncovering said outlet port in said casing member, bearings mounted respectively on opposite sides of said valve, one on said casing and one on said cover, and an operating member for said second valve, extending into said chamber through said casing and operatively supported by said bearings in said casing member and said cover member.

CLYDE C. FARMER.